United States Patent [19]
Terada et al.

[11] Patent Number: 5,296,982
[45] Date of Patent: Mar. 22, 1994

[54] THIN-FILM MAGNETIC HEAD HAVING SLIDER BODY FORMED OF FERRITE

[75] Inventors: Nobuhiro Terada, Kasugai; Soichiro Matsuzawa, Kuwana, both of Japan

[73] Assignee: NGK Insulators, Ltd., Japan

[21] Appl. No.: 895,854

[22] Filed: Jun. 9, 1992

[30] Foreign Application Priority Data

Jun. 13, 1991 [JP] Japan .................. 3-168778

[51] Int. Cl.$^5$ .............................. G11B 5/10
[52] U.S. Cl. ..................... 360/103; 360/126
[58] Field of Search ............ 360/102, 103, 126

[56] References Cited

U.S. PATENT DOCUMENTS

| | | | |
|---|---|---|---|
| 4,219,853 | 8/1980 | Albert et al. | 360/103 |
| 4,893,203 | 1/1990 | Ezaki et al. | 360/103 |
| 5,094,897 | 3/1992 | Morita et al. | 360/103 |
| 5,198,949 | 3/1993 | Narisawa et al. | 360/119 |

FOREIGN PATENT DOCUMENTS

| | | |
|---|---|---|
| 0242887 | 10/1987 | European Pat. Off. . |
| 0330398 | 8/1989 | European Pat. Off. . |
| 54-27415 | 3/1979 | Japan . |
| 57-123516 | 8/1982 | Japan . |
| 61-156508 | 7/1986 | Japan . |

OTHER PUBLICATIONS

Patent Abstracts of Japan, vol. 9, No. 170 (P-373) Jul. 16, 1985.
Patent Abstracts of Japan, vol. 7, No. 262 (P-238) Nov. 22, 1983.
IBM Technical Disclosure Bulletin, vol. 25, No. 7A, Dec. 1982.
2311 Fujitsu Scientific & Technical Journal, vol. 26, No. 4, Feb. 1991, pp. 353-364.

*Primary Examiner*—Louis J. Casaregola
*Attorney, Agent, or Firm*—Parkhurst, Wendel & Rossi

[57] ABSTRACT

A thin-film magnetic head including: a slider body formed of a ferrite material and having air bearing portions on one major surface thereof on which a magnetic recording medium is slidable; a non-magnetic layer formed in the slider body such that the non-magnetic layer is located at least on a trailing end face of each of the air bearing portions, the non-magnetic layer having a thickness of at least 20 μm; a head portion including an upper and a lower magnetic layer and a coil which are positioned within an area of the non-magnetic layer. The lower magnetic layer, the coil and the upper magnetic layer are laminated on the non-magnetic layer such that the upper and lower magnetic layers constitute a closed magnetic path, and such that a magnetic gap is formed between the upper and lower magnetic layers and is open in a top face of each air bearing portion.

10 Claims, 8 Drawing Sheets

THIN-FILM MAGNETIC HEAD HAVING SLIDER BODY FORMED OF FERRITE

BACKGROUND OF THE INVENTION

1. Field of the Invention

The present invention relates to a thin-film magnetic head for a rigid magnetic disk drive (RDD), which includes a slider body formed of ferrite and which exhibits relatively low inductance.

2. Discussion of the Prior Art

Figure 1:
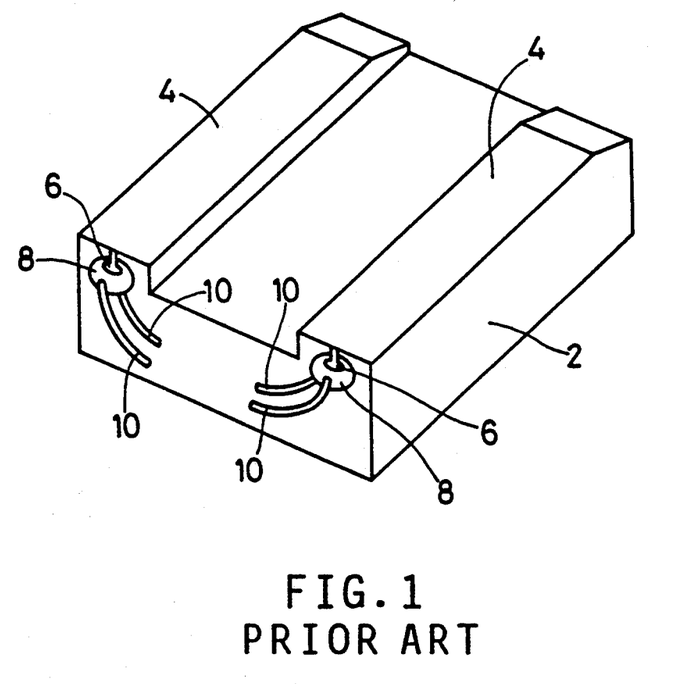
FIG. 1 is a perspective view of one example of conventional thin-film magnetic head.

As one kind of magnetic head of air-bearing or flying type for a rigid magnetic disk drive (RDD), there is known a so-called thin-film magnetic head including a slider body having air bearing portions on its surface on which a magnetic recording medium is slidable, and a head portion consisting of thin films formed on a trailing end face of each of the air bearing portions. Referring to FIG. 1 showing an example of thin-film magnetic head of this type, a slider body 2 has a pair of rail-shaped air bearing portions 4, 4 formed on its surface on which a magnetic recording medium is slidable. The air bearing portions 4, 4 have a suitable width, and extend in parallel with each other in the direction in which the recording medium slides. On the trailing end face (i.e., rear end face as viewed in the sliding direction) of each of the air bearing portions, there is formed a thin-film head portion which includes upper and lower magnetic poles 6, 6 in the form of thin films, and a thin-film coil 8 interposed between the magnetic poles 6, 6. Leads 10, 10 are connected to the opposite ends of the coil 8 so that a suitable electric current may be applied to the coil 8 through the leads 10, 10.

In the thin-film magnetic head as described above, the slider body 2 is generally formed of a material such as $CaTiO_3$ or $Al_2O_3$-TiC. The slider body 2 formed of $CaTiO_3$ has a high coefficient of friction with respect to a magnetic disk (magnetic recording medium), and therefore has a high tendency of damaging the magnetic disk due to the frictional contact, whereby the slider body itself is likely to be damaged. The slider body 2 formed of $Al_2O_3$-TiC has a poor sliding characteristic with respect to the magnetic disk, and therefore has a high tendency of damaging the magnetic disk. Where the air bearing portions 4, 4 of the slider body 2 have peculiar configuration, such as a bridging structure as in a negative-pressure type magnetic head slider, or a shaped rail structure, such configuration must be usually achieved by an ion-etching method, which pushes up the cost of manufacture of the head due to an expensive installation for the etching operation and relatively slow etching speed.

In view of the above, it has been proposed that the slider body of the thin-film magnetic head is formed of a magnetic material consisting of ferrite that has an excellent sliding property with respect to a magnetic recording medium such as a magnetic disk. Some examples of magnetic heads using the ferrite material are disclosed in JP-A-54-27415 and JP-A-57-123516, wherein a non-magnetic material such as glass is embedded in a groove(s) formed in a ferromagnetic substrate such as ferrite, so that upper and lower magnetic poles are spaced a suitable distance apart from each other by the non-magnetic material, so as to enhance the operating efficiency of the magnetic head. However, this type of magnetic head cannot enjoy some advantageous features of the conventional thin-film magnetic head, since the ferrite substrate (slider body) serves as one of the magnetic poles (lower magnetic pole). Namely, when a bulk material such as ferrite is used as a magnetic pole, the inductance of the obtained magnetic head is undesirably increased, compared to when the magnetic poles consist only of thin films. Thus, the magnetic head of the above type fails to exhibit low inductance that is a typical feature of the thin-film magnetic head.

Another example of the magnetic head using the ferromagnetic substrate is disclosed in JP-A-61-156508, wherein a thin-film head portion consisting of upper and lower magnetic layers and coil are formed on the ferromagnetic substrate such as ferrite. Conventionally, the magnetic head of this type suffers from magnetic flux leakage from the upper magnetic layer toward the ferromagnetic substrate having a relatively large width, resulting in an undesirably increased track width. To avoid this, the magnetic head disclosed in the above-identified publication is constructed such that its portion in the vicinity of the magnetic gap (where the magnetic disk slides) is filled with a suitable non-magnetic material, so that the magnetic flux leakage occurs between the upper and lower magnetic layers. Nonetheless, the thus constructed magnetic head also suffers from relatively high inductance, since the lower magnetic pole consists of the lower magnetic layer and ferromagnetic bulk body.

SUMMARY OF THE INVENTION

It is therefore an object of the present invention to provide a thin-film magnetic head having a substrate or slider body formed of ferrite, which magnetic head exhibits relatively low inductance while ensuring an excellent sliding characteristic with respect to a magnetic recording or data storage medium.

The above object may be attained according to the principle of the present invention, which provides a thin-film magnetic head comprising (a) a slider body formed of a ferrite material and having air bearing portions on one major surface thereof on which a magnetic recording medium is slidable, (b) a non-magnetic layer formed in the slider body such that the non-magnetic layer is located at least on a trailing end face of each of the air bearing portions, the non-magnetic layer having a thickness of at least 20 $\mu$m; (c) a head portion including an upper and a lower magnetic layer and a coil which are positioned within an area of the non-magnetic layer, at least the lower magnetic layer, the coil and the upper magnetic layer being successively laminated on the non-magnetic layer such that the upper and lower magnetic layers constitute a closed magnetic path, and such that a magnetic gap is formed between the upper and lower magnetic layers, the magnetic gap being open in a top face of each air bearing portion.

In the thin-film magnetic head of the invention constructed as described above, the non-magnetic layer is interposed between the slider body formed of ferrite and the lower magnetic layer of the thin-film head portion. Therefore, the slider body itself never serves as a magnetic pole, and the magnetic circuit consists solely of the lower and upper magnetic layers, as in the conventional thin-film magnetic head, assuring low inductance as a typical feature of the thin-film magnetic head. The present magnetic head is also advantageous in that the magnetic recording media can smoothly slide on the slider body which is substantially formed of ferrite having excellent sliding property.

BRIEF DESCRIPTION OF THE DRAWINGS

The above and optional objects, features and advantages of the present invention will become more apparent by reading the following detailed description of a presently preferred embodiment of the present invention, when considered in connection with the accompanying drawings, in which.

DETAILED DESCRIPTION OF THE PREFERRED EMBODIMENT

Figure 2:
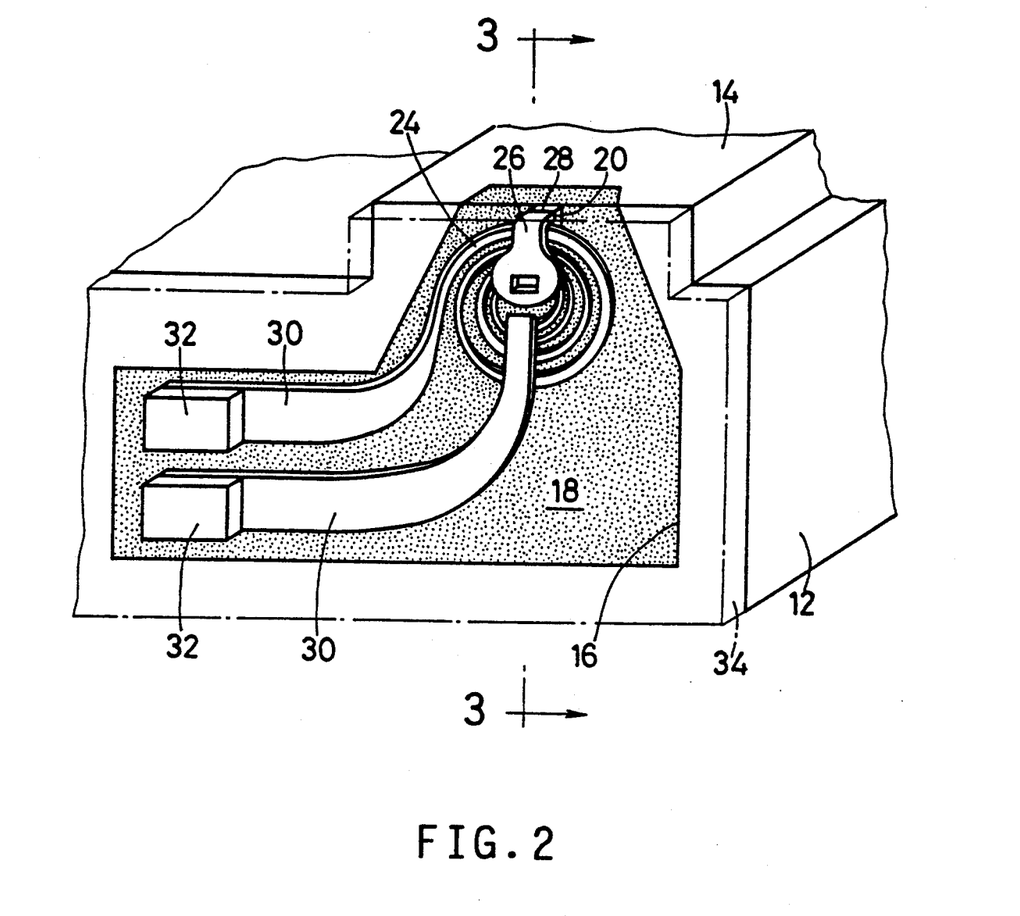
FIG. 2 is a fragmentary perspective view of one embodiment of a thin-film magnetic head of the present invention.
Figure 3:
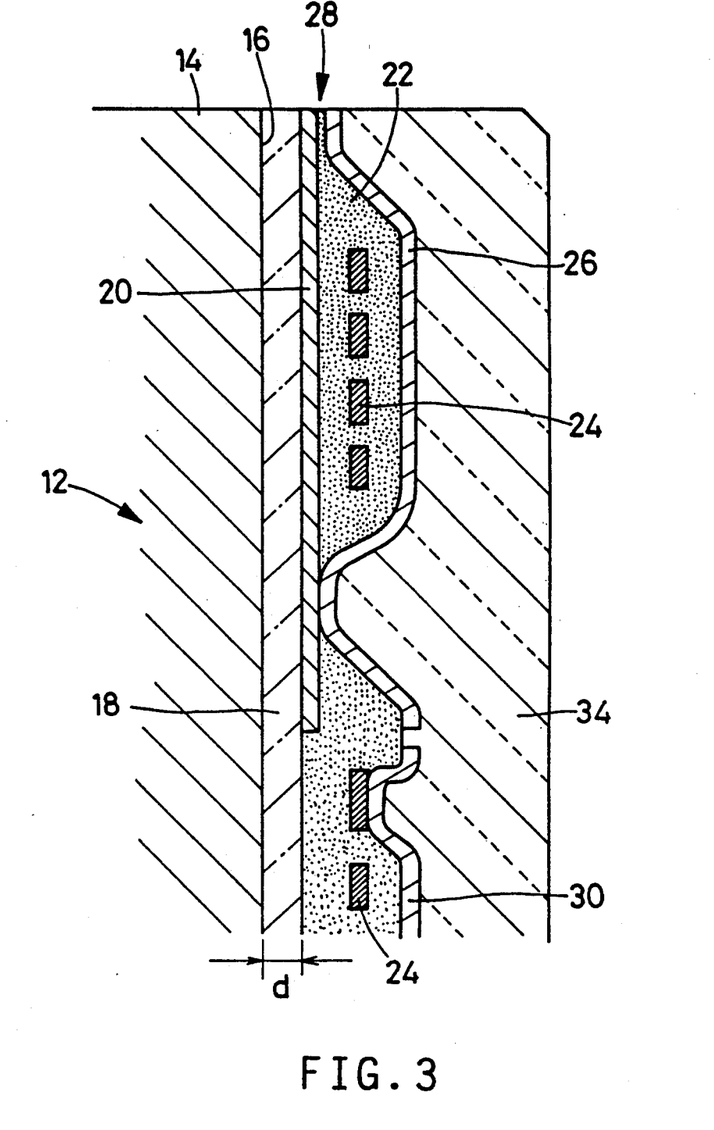
FIG. 3 is a cross sectional view taken along 3—3 of FIG. 2.

Referring first to FIGS. 2 and 3, reference numeral 12 denotes a slider body formed of a ferrite material such as Ni-Zn ferrite or Mn-Zn ferrite. Like the conventional slider body, this slider body 12 has a pair of air bearing portions 14 formed on one major surface thereof on which a magnetic recording medium such as a magnetic disk slides in operation. The slider body 12 has two recesses 16 formed in respective end faces of the air bearing portions 14 on the trailing side thereof. Each recess 16 has a sufficiently large area and a predetermined thickness (d). The recess 16 is filled with a suitable non-magnetic material such as glass, so that a non-magnetic layer 18 having the above-indicated thickness (d) is formed in the slider body 12.

A thin-film head portion as included in the conventional thin-film magnetic head is formed on the non-magnetic layer 18 formed in the trailing end face of the slider body 12. Initially, a lower magnetic pole 20 in the form of a magnetic layer is formed on the non-magnetic layer 18, and a suitable pattern of coil 24 is located above the lower magnetic pole 20 such that the magnetic pole 20 and coil 24 are electrically and magnetically insulated from each other by an insulating resist 22. Further, an upper magnetic pole 26 in the form of a magnetic layer is located above the coil 24 and insulated from the coil 24 by the insulating resist 22. As is apparent from FIGS. 2 and 3, these upper and lower magnetic poles 26, 20 and coil 24 are positioned within the area of the non-magnetic layer 18. The lower magnetic pole 20 cooperates with the upper magnetic pole 26 to provide a closed magnetic path (magnetic circuit), which includes a magnetic gap 28 with a suitable width formed between the corresponding end portions of these magnetic poles 20, 26 on the side of a top face of the corresponding air bearing portion 14. As is apparent from FIG. 1, the magnetic gap 28 is open in the top face of the air bearing portion 14.

In FIGS. 2 and 3, reference numeral 30 denotes magnetic films which serve as conductors or leads for the coil 24. Each of the magnetic films 30 is connected at its one end to one of opposite ends of the coil 24 and at the other end to a lead terminal 32. On the thin-film head portion thus formed in lamination on the non-magnetic layer 18, there is provided a protective layer 34 with a suitable thickness, as shown in FIG. 3, for protecting the upper magnetic pole 26 and others. The edge portion of the protective layer 34 is chamferred in the known manner.

In the thus constructed thin-film magnetic head, the slider body 12 itself does not serve as a magnetic pole since the non-magnetic layer 18 is interposed between the slider body 12 formed of ferrite and the lower magnetic pole 20. Accordingly, like the conventional thin-film magnetic head, the magnetic circuit consists solely of the upper and lower magnetic poles 26, 20, assuring low inductance that is a typical feature of the thin-film magnetic head. The present magnetic head is also advantageous in that a magnetic recording or data storage medium can smoothly slide on the slider body which is substantially formed of a ferrite material having an excellent sliding characteristic for such recording medium.

Figure 4:
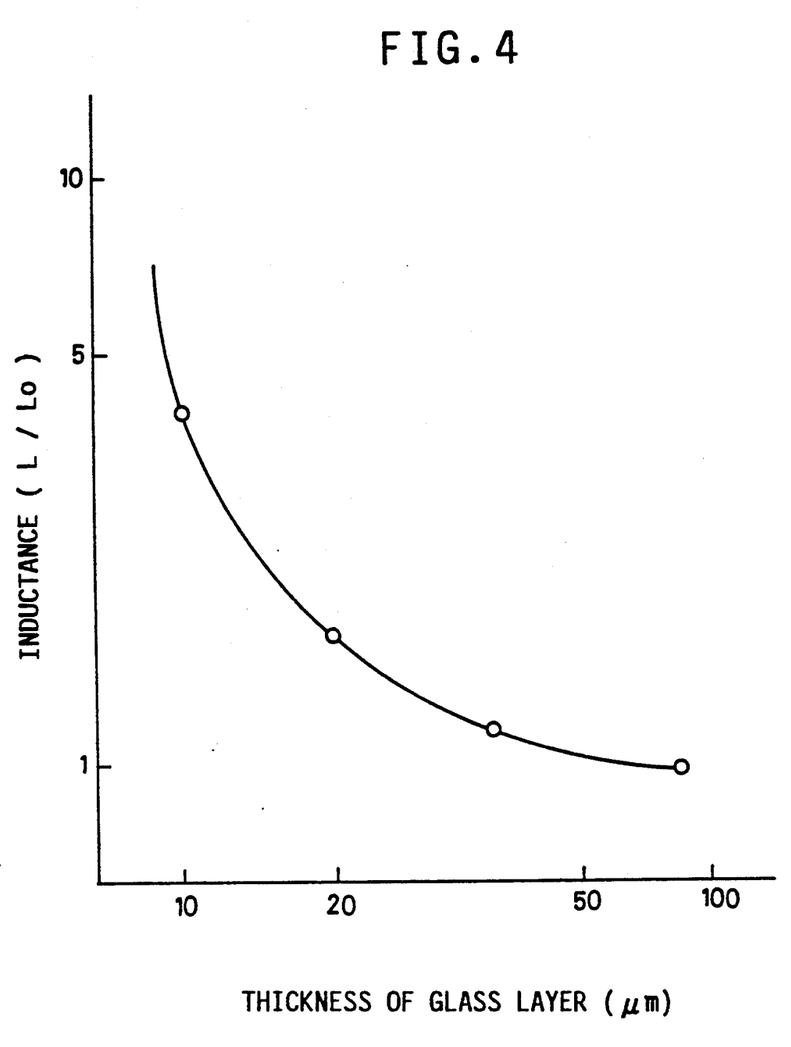
FIG. 4 is a graph indicating a relationship between the thickness of a non-magnetic layer (glass), and the inductance of the present magnetic head using a slider body made of ferrite.

To sufficiently accomplish the object of the present invention, the thickness (d) of the non-magnetic layer 18 formed in the trailing end face of the slider body 12 needs to be equal to or larger than 20 $\mu$m. The graph of FIG. 4 indicates a relationship between the thickness (d) of a glass layer as the non-magnetic layer (18) formed on the slider body made of Mn-Zn ferrite, and the inductance "L" of the instant magnetic head which is standardized or determined by reference inductance "$L_o$" of a magnetic head using a slider body made of a non-magnetic material. As is apparent from FIG. 4, the inductance "L" is extremely increased as the thickness (d) of the glass layer as the non-magnetic layer (18) becomes smaller than 20 $\mu$m. Thus, the thin-film magnetic head with a non-magnetic layer of less than 20 $\mu$m is difficult to achieve sufficiently lowered inductance.

While the thin-film magnetic head of the invention as described above may be readily produced by a suitable known method, there will be hereinafter described one preferred method of producing the magnetic head.

Initially, a ferrite block 40 is prepared which has a thickness slightly larger than the length of the slider body produced. While the ferrite block 40 may be formed of either a single crystal of Ni-Zn ferrite or Mn-Zn ferrite, or a poly-crystalline ferrite, it is desirable to use the single crystal ferrite which provides straight edges with higher accuracy in the following etching steps.

Figure 5:
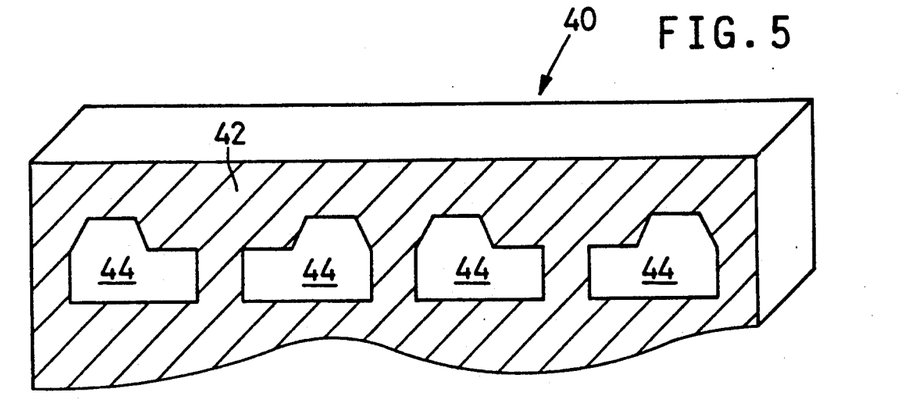
FIG. 5 is a view showing a ferrite block on which a photolithography operation is effected during manufacture of the thin-film magnetic head of the present invention.
Figure 6:
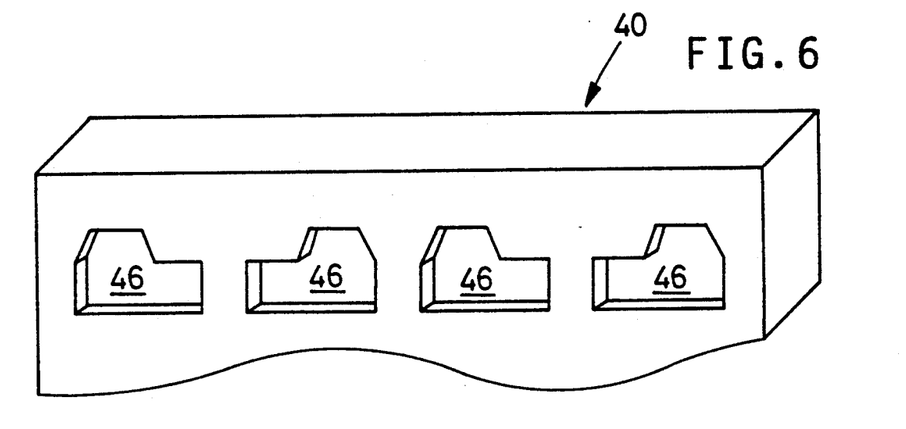
FIG. 6 is a view showing the ferrite block in which recesses to be filled with a non-magnetic material are formed by photolithography and chemical etching.
Figure 7:
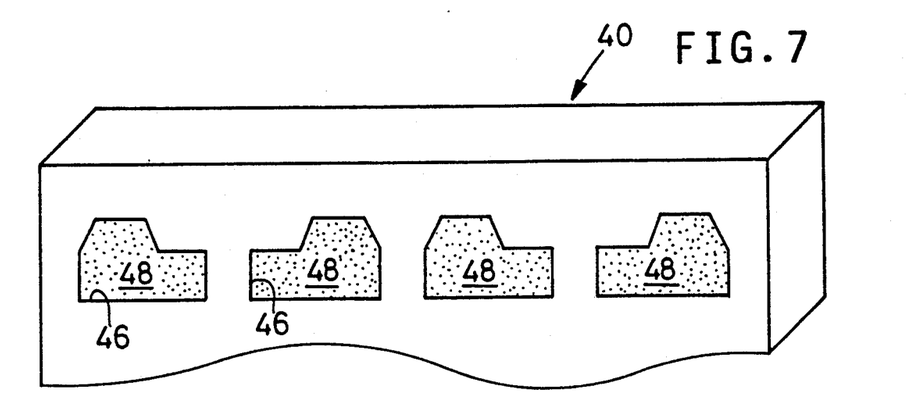
FIG. 7 is a view showing the ferrite block wherein the recesses are filled with the non-magnetic material.

Referring to FIG. 5, one surface of the thus prepared ferrite block 40 (which eventually provides the trailing end face of the slider body) is coated with a photo resist, then exposed and developed by a photolithography method, so that the photo resist covers the above-indicated one surface of the block 40 except its portions to which a non-magnetic material is to be applied later. In FIG. 5, reference numeral 42 denotes the photo resist formed on the above-indicated one surface of the ferrite block 42, and reference numeral 44 denotes the above-indicated portions to which the non-magnetic material will be applied. Then, a known chemical etching operation using a suitable acid such as phosphoric acid is effected on the one surface of the ferrite block 42 with the patterned photo resist 42, whereby recesses 46 adapted to receive the non-magnetic material are formed as shown in FIG. 6. This chemical etching is effected so that the thickness of the recesses 46 is slightly larger than that of the non-magnetic layer (18) to be formed. The size or area of the recesses 46 is determined so that the magnetic poles, coil and others to be formed on the non-magnetic layer (18) do not overlap the ferrite portion surrounding the recesses 46. Successively, a glass material used as the non-magnetic material, which has a softening point of 470° C., is fused at a working temperature of 650° C., and is applied so as to fill the recesses 46 formed in the ferrite block 40. Thereafter, redundant portions of the glass masses applied are removed to provide glass layers 48 as shown in FIG. 7. The exposed surfaces of the glass layers 48 are mirror-polished so that the thickness of the layers 48 embedded in the recesses 46 coincides with the thickness of the non-magnetic layer (18) to be obtained. Then, a non-magnetic material such as $Al_2O_3$ may be applied to the glass layers 48 by sputtering, as needed, and the surfaces of the layers 48 are finished by lapping, for example.

Figure 8:
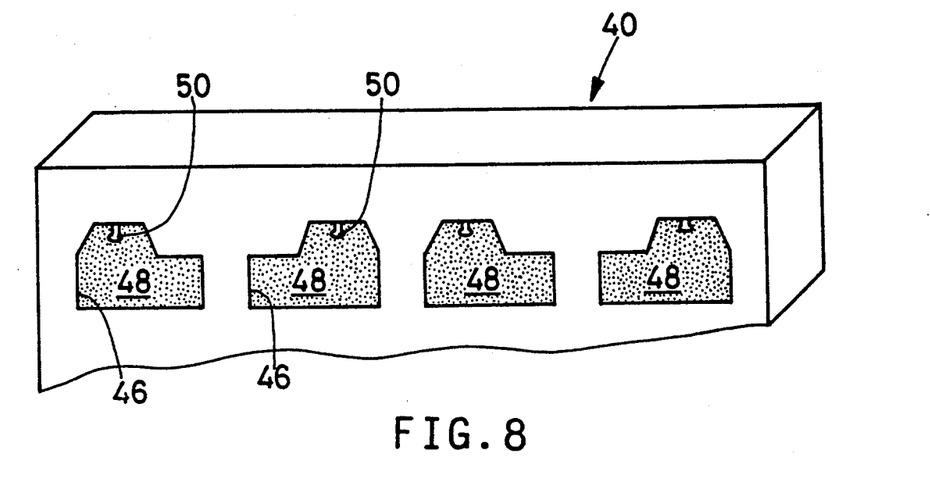
FIG. 8 is a view showing the ferrite block wherein lower magnetic layers are formed in pattern on the masses of the non-magnetic material.

As shown in FIG. 8, a lower magnetic layer 50 formed in a suitable pattern, which gives the lower magnetic pole 20 shown in FIG. 3, is formed on the exposed surface of each of the glass layers 48 embedded in the ferrite block 40. The lower magnetic layer 50 may be formed by electroplating after a frame defining the pattern of the layer 50 is formed by using a resist or the like. In this case, Ni-Fe alloy is favorably used as a magnetic material for the layer 50. Alternatively, a magnetic film is applied over the entire area of the exposed surface of the glass layer 48 by sputtering, patterned by using a resist, and then ion-milled. With the resist then removed, the desired lower magnetic layer 50 is obtained. In this case, the magnetic material for the layer 50 is favorably selected from amorphous alloys (metal-metal) such as Co-Zr-Nb, and alloys containing Fe, Si and Al.

On the thus formed lower magnetic layer 50, there is formed a suitable thickness of an insulating film made of $Al_2O_3$ or $SiO_2$, which serves as a gap layer for forming the above-indicated magnetic gap (28). This insulating film is removed at a back gap where the lower magnetic layer 50 is connected to an upper magnetic layer which gives the upper magnetic pole 26 shown in FIG. 3. Thereafter, an insulating layer which forms a raised portion of the insulating resist 22 is formed by a photo resist made of a photosensitive resin. The photo resist is applied by coating to the above insulating film to give the thickness of 2-3 $\mu$m, formed in a suitable pattern, and then subjected to curing, so that the raised portion formed has end faces that are inclined by a suitable angle.

The coil is formed in a suitable pattern on the thus formed insulating layer, preferably by electroplating. For instance, a conductor metal such as copper is applied by sputtering to provide a base electrode layer of 0.1-0.2 $\mu$m in thickness. Then, a portion of this electrode layer on which the coil is not to be formed is covered by a photo resist, and a conductive metal such as copper is applied by electroplating to form a 3-4 $\mu$m thickness metallic layer. Successively, the photo resist is peeled off, and the base electrode layer is removed, whereby a desired pattern of coil is formed. The thus formed coil is designated at 51 in FIG. 9. As needed, two or three layers of coil may be formed with an insulating layer(s) interposed therebetween.

After the formation of the coil 51 having a given number of turns, the coil 51 is coated with an insulating layer such as a photo resist. The photo resist is then patterned, and cured so as to level the unevenness of the coil-bearing surface and form suitably inclined end faces for contact with the upper magnetic layer. Then, the upper magnetic layer which gives the upper magnetic pole shown in FIG. 3 is formed on the thus formed insulating layer, according to the same method as employed for forming the lower magnetic layer 50. The thus formed upper magnetic layer is designated at 52 in FIG. 9.

Figure 9:
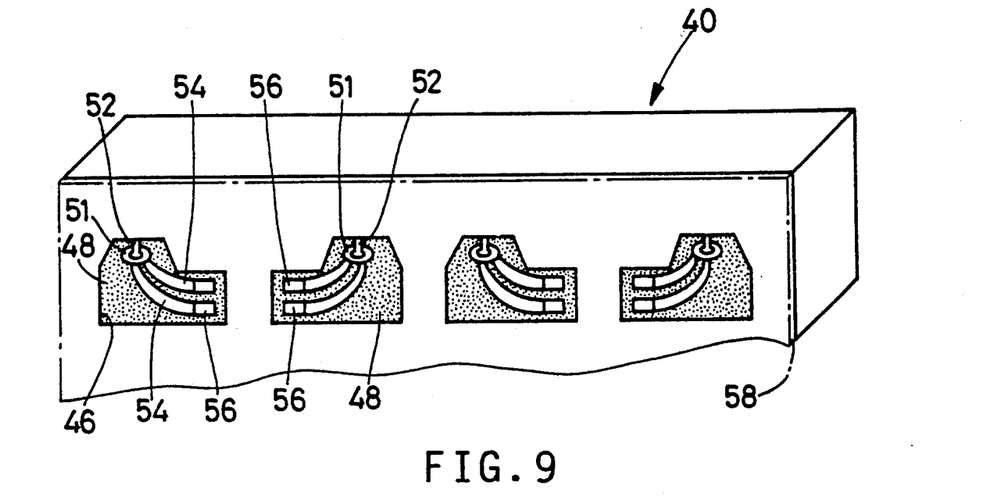
FIG. 9 is a view showing the ferrite block provided with upper and lower magnetic layers, coils, conductive layers, pads and protective layers.

Conductive layers 54 which give the magnetic films 30 shown in FIG. 3 are formed in the same manner as the above-described upper magnetic layer 52. Further, pads 56 which provide the lead terminals 32 are formed at the respective end portions of the conductive layers 54. Each pad 56 consists of a thick metallic film formed of copper, for example, and has a thickness of 30-50 $\mu$m. In addition, a non-magnetic material such as $Al_2O_3$ is applied by sputtering to form a protective layer 58 of 30-50 $\mu$m in thickness, for protecting the magnetic poles (50, 52), coils (51) and lead portions (54, 56). The thus formed $Al_2O_3$ layer is lapped or ground and removed at its portions corresponding to the pads 56, so that the exposed surfaces of the pads 56 can be electrically connected to lead wires. To improve the electric connection between the pads 56 and lead wires, the exposed surfaces of the pads 56 may be plated with gold, as needed. FIG. 9 shows the ferrite block 40 which has been processed as described above.

Figure 10:
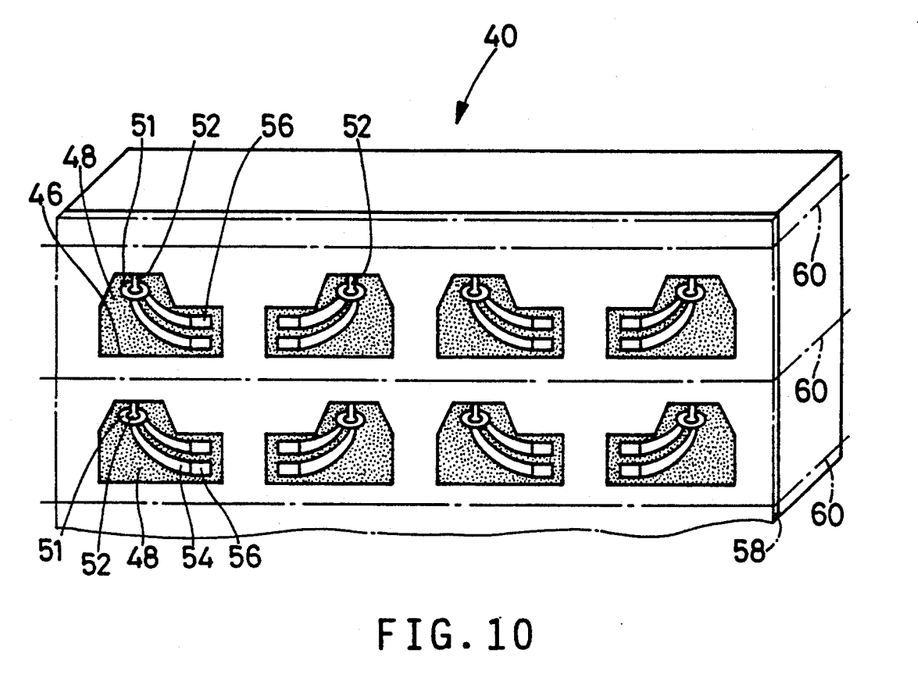
FIG. 10 is a view explaining a step of cutting the ferrite block into ferrite bars.

After the magnetic poles (50, 52), coil (51), lead portions (54, 56) and others are formed on the ferrite block 40 via the glass layers 48, the ferrite block 40 is cut along cutting lines 60 into two or more ferrite bars 62, each of which provides a plurality of thin-film magnetic heads.

Figure 11:
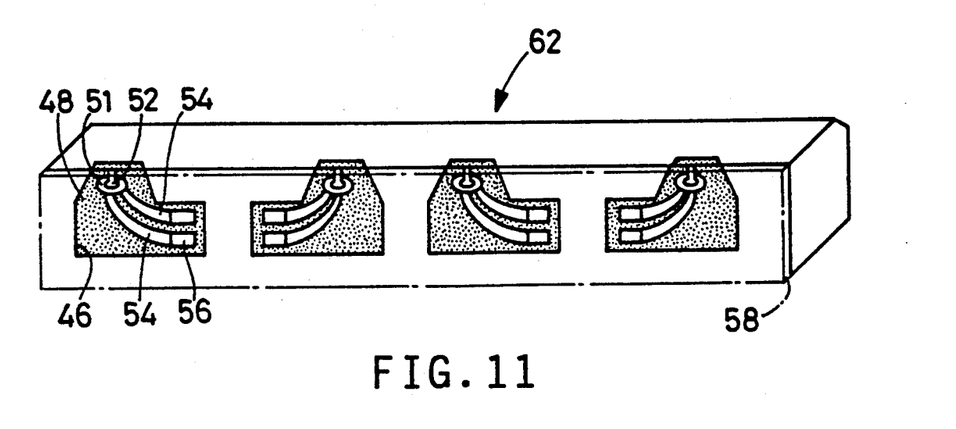
FIG. 11 is a view explaining a step of processing one of the ferrite bars obtained.

According to a known method, a grinding operation is effected on the bottom face of the thus obtained ferrite bar 62 which provides the bottom of the slider body, and the depth of the magnetic gaps is adjusted by grinding, with high accuracy, according to a predetermined pattern for detecting the gap depth. The ferrite bar 62 is then machined to provide a leading ramp at the end portion remote from the magnetic gaps. Finally, the trailing portion of the ferrite bar 62 and the edge of the protective layer (58) are chamferred. Thus, the slider bodies obtained from the ferrite bar 62 are less likely to cause damages to magnetic disks or other magnetic recording media sliding thereon, and the edge portions of the slider bodies per se are protected against damage.

Figure 12:
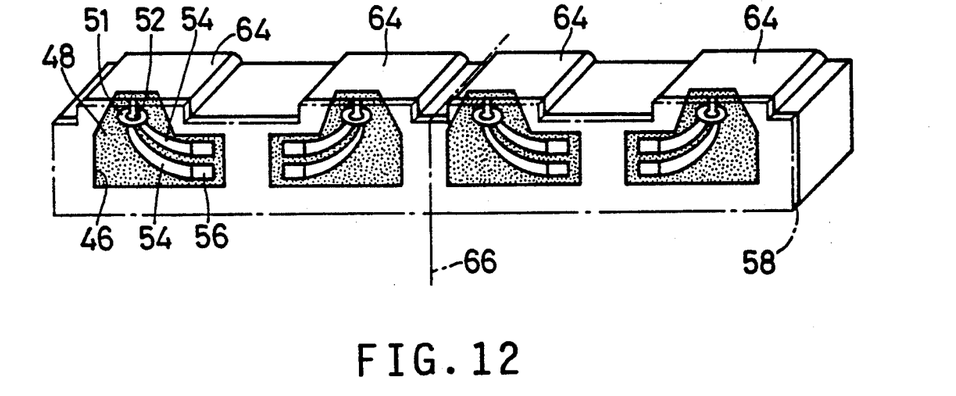
FIG. 12 is a view explaining a step of forming air bearing portions in the ferrite bar.

Subsequently, air bearing portions 64 are formed on the portions of the ferrite bar 62 on which the magnetic poles (50, 52), coils (51) and others are formed, as shown in FIG. 12. While the air bearing portions 64 may be formed by machining, photolithography and chemical etching operations are preferably used for forming these portions 64. Finally, a redundant portion of the leading end of the ferrite bar 62 is trimmed, as needed, so that the width of the bar 62 coincides with the nominal length of the slider body. Then, the ferrite bar 62 is cut along cutting lines 66 into a plurality of slider bodies having desired thin-film magnetic heads. The thus obtained magnetic head is constructed as shown in FIGS. 2 and 3.

While one embodiment of thin-film magnetic head of the present invention, and a preferred method of producing the magnetic head have been described, it is to be understood that the invention is not limited to the details of the illustrated embodiment, but may be embodied with various changes, modifications and improvements, which may occur to those skilled in the art, without departing from the principle of the invention which is understood from the foregoing description.

In the illustrated embodiment, the non-magnetic layers 18 are formed in appropriate regions of the trailing end face of the ferrite slider body 12, so as to space the slider body 12 apart from the lower magnetic poles 20, such that each region has an area sufficiently large to include the upper and lower magnetic poles 20, 26 and coil 24. However, the non-magnetic layer 18 may be formed over the entire area of the trailing end face of the slider body 12. In this case, the air bearing portions 14 (64) including a part of the non-magnetic layer 18 cannot be formed by a photolithography or chemical etching operation. Therefore, the air bearing portions must be formed by machining or any other suitable method.

In producing the thin-film magnetic head of the present invention, the recesses 46 adapted for receiving the non-magnetic material may be formed in the relevant surface of the ferrite block 42 by machining, rather than by the chemical etching method as described above. For example, vertical and horizontal grooves having a suitable width are formed in the relevant surface of the ferrite block 40, and intersecting sections of these grooves having a sufficiently large area is filled with the non-magnetic material. Then, the upper and lower magnetic poles and coil are laminated on the non-magnetic layer embedded in the intersecting sections of the grooves, so as to form a desired thin-film head portion.

What is claimed is:

1. A thin-film magnetic head comprising:
   a slider body formed of a ferrite material and having air bearing portions on one major surface thereof on which a magnetic recording medium is slidable, each of said air bearing portions having a trailing end face in which a recess if formed;
   a non-magnetic layer formed in said slider body such that said non-magnetic layer is at least embedded in said recess in said trailing end face of each of said air bearing portions, said non-magnetic layer having a thickness of at least 20 $\mu$m;
   a head portion including an upper and a lower magnetic layer and a coil which are positioned within an area of said non-magnetic layer, at least said lower magnetic layer, said coil and said upper magnetic layer being laminated on said non-magnetic layer such that said upper and lower magnetic layers constitute a closed magnetic path, and such that a magnetic gap is formed between said upper and lower layers, said magnetic gap being open in a top face of said each air bearing portion.

2. A thin-film magnetic head according to claim 1, wherein said non-magnetic layer is formed of glass.

3. A thin-film magnetic head according to claim 1, further comprising an insulating film disposed between corresponding end portions of said upper and lower magnetic layers on the side of said top face of said each air bearing portion, said insulating film providing said magnetic gap.

4. A thin-film magnetic head according to claim 3, wherein said insulating film is formed of at least one of $Al_2O_3$ and $SiO_2$.

5. A thin-film magnetic head according to claim 1, further comprising at least one insulating layer interposed between said lower magnetic layer and said coil, and between said coil and said upper magnetic layer, for insulating said upper and lower magnetic layers and said coil from each other.

6. A thin-film magnetic head according to claim 5, wherein said at least one insulating layer forms a raised portion having inclined end faces, said upper magnetic layer being formed on said raised portion.

7. A thin-film magnetic head according to claim 5, wherein said at least one insulating layer is formed of a photosensitive resin.

8. A thin-film magnetic head according to claim 1, wherein said ferrite material for said slider body is selected from Ni-Zn ferrite and Mn-Zn ferrite.

9. A thin-film magnetic head according to claim 1, wherein said head portion further includes two conductive layers connected to opposite ends of said coil, and two lead terminals connected to respective ends of said two conductive layers remote from said coil.

10. A thin-film magnetic head according to claim 1, further comprising a non-magnetic protective layer formed on at least said upper magnetic layer, for protecting said head portion.

* * * * *